April 6, 1926.
L. E. LA·BRIE
VEHICLE WHEEL
Original Filed Nov. 30, 1923
1,579,328
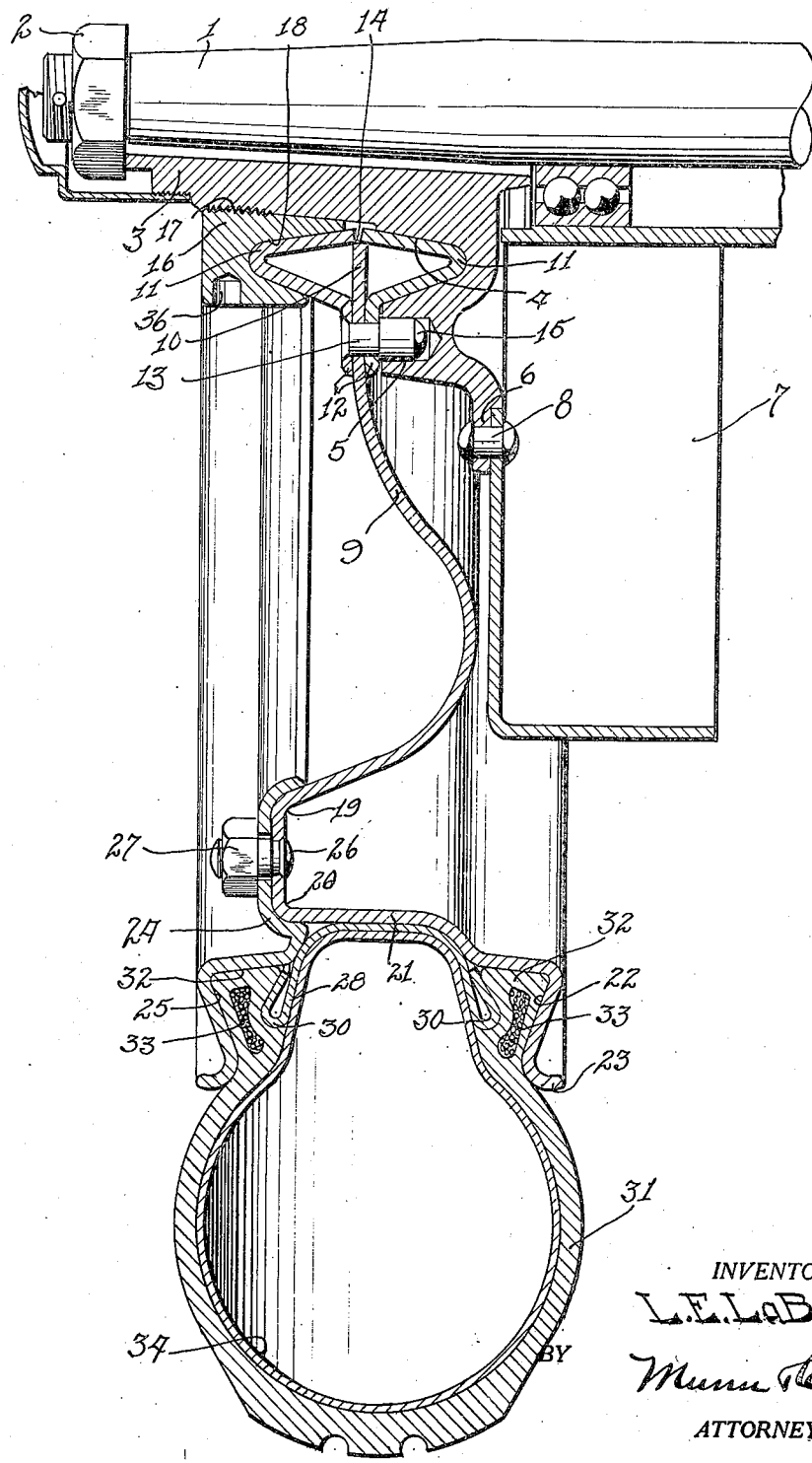
INVENTOR
L.E.LaBrie
BY Munn &Co.
ATTORNEYS Patented Apr. 6, 1926.

1,579,328

UNITED STATES PATENT OFFICE.

LUDGER ELIZÉ LA BRIE, OF CHICAGO, ILLINOIS, ASSIGNOR TO MOTOR INDUSTRIES, INC., OF CHICAGO, ILLINOIS, A CORPORATION OF ILLINOIS.

VEHICLE WHEEL.

Original application filed November 30, 1923, Serial No. 677,809. Divided and this application filed August 15, 1924, Serial No. 732,303. Renewed August 22, 1925.

*To all whom it may concern:*

Be it known that I, LUDGER E. LA BRIE, a citizen of the United States, and a resident of Chicago, in the county of Cook and State of Illinois, have invented a new and useful Improvement in Vehicle Wheels, of which the following is a full, clear, and exact description.

My invention relates to improvements in vehicle wheels, and it consists in the combinations, constructions, and arrangements herein described and claimed.

This application is a division of a prior application No. 677,809, filed November 30, 1923. The present application as well as the prior application discloses a vehicle wheel in which there is a novel means for holding a tire casing in place upon the rim of the wheel and also hub structure. The hub structure forms the subject of the present application, and the rim structure is set forth in the prior application.

An object of the present invention is to provide a vehicle wheel which is so constructed as to permit the quick removal of the wheel from its hub portion by the mere loosening and removal of a single king nut.

A further object of my invention is to provide a vehicle wheel in which the major portion of the wheel is particularly well adapted to the present day metal drawing process.

A further object of my invention is to provide a vehicle wheel of the type described which is extremely simple in construction, is durable, and neat in appearance.

Other objects and advantages will appear in the following specification, and the novel features of the invention will be particularly pointed out in the appended claims.

My invention is illustrated in the accompanying drawings, forming part of this application, in which the figure is a sectional view showing one embodiment of my invention.

In carrying out my invention I make use of the ordinary type of vehicle wheel axle 1, having a nut 2 thereupon, by means of which a hub 3, which is rotatably mounted upon the axle 1, is retained against lateral movement, and consequently dislodgement from the axle 1.

The hub 3 is provided with a V-shaped depression 4 on its outermost side wall, and a plurality of depressions 5 arranged in annular alignment and concentric with the annular V-shaped depression 4. An outwardly extending radial flange 6 is formed on the hub portion 3, by means of which a brake drum 7 is supported concentric with the axle 1, by means of rivets 8 projected through the brake member 7 and the flange 6.

My improved vehicle wheel consists in a metal disk 9 of a substantially resilient and durable metal, such as any high quality of steel, fashioned in the manner shown in the drawing, so that its inner portion is in substantially vertical alignment, as shown at 10, when the wheel is erect. A pair of annular cooperating members 11 is disposed one on either side of the innermost portion 10 of the disk 9. These annular members 11 are substantially V-shaped in cross section, and have outwardly extending flange portions 12, by means of which the members 11 are secured to the disk 9 by the use of rivets 13 projected through the portions 12 and the disk 9. The members 11 are welded to the innermost portion of the disk 9, as shown at 14, and to one another. The rivets 13 are each provided with an inwardly extending stud portion 15, which are arranged to enter the depressions 5 in the hub, and therefore prevent rotation of the disk 9 relative to the hub.

Means for securely locking the disk 9 to the hub 3 is provided in a locking ring 16, which is provided with threads in the interior walls thereof which are arranged to engage with threads on the exterior walls 3, as shown at 17. The locking ring 16 has an annular recess 18 in its innermost side walls, substantially V-shaped in cross section and arranged to conform to the outer contour of the adjacent member 11. It should be noted at this time that the depression 4 in the outermost wall of the hub 3 is arranged to conform with the contour of the outer wall of the adjacent member 11.

The disk 9 is bent laterally adjacent its outermost end at 19 and 20, so that a portion 21 of the disk is in substantially horizontal alignment when the major portion of the disk is in vertical alignment, i. e., at the time the wheel is erect. The inner end of the horizontal portion 21 of the disk is bent laterally, so as to form a trough 22 substantially V-shaped in cross section, and disposed in the position shown in the figure. The extreme outer end of the disk is curved outwardly at 23, so as to lie free of the side walls of the pneumatic casing disposed upon the rim formed by the portion 21 of the disk 9.

The retaining ring 24 is provided, and has a trough-shaped portion 25 corresponding to the portion 22 of the disk 9, and is arranged to be removably attached to the disk 9 by means of bolts 26, secured to the disk 9, and nuts 27 for the bolts 26.

An inner or auxiliary rim 28 is disposed concentric with the rim portion 21 of the disk 9, and has its opposite side walls 30 rolled outwardly in the manner shown in the drawing, so as to obviate sharp edges. This auxiliary rim 28 is narrower than the casing supporting rim, which is formed by the rim portion 21 and the retaining ring 24, so that there is a space between the rim 28 and the rim 21—24. This space is greater in width at the inner end than at the outer end. It should be noted at this time that the auxiliary rim 28 may be constructed as one or a plurality of parts. In the present instance, I have shown the rim 28 as a single part, and not constructed in segments.

The pneumatic tire casing 31 is provided, and the lower portion of the side walls 32 is fashioned to conform with the space between the auxiliary rim 28 and the rim 21—24. This portion or bead of the casing 31 is also provided with a cable insert 33 to prevent stretching of the casing at its innermost end.

An inner tube 34 is provided, having greater cubical contents than the casing 31. This tube 34 is permitted to extend down in the rim 38, while the casing 31 only extends into that portion of the rim occupied by the trough portions 22 and 25 on one side, and the rolled portions 30 of the rim 28 on the opposite side. It will be noted at this time that in order to remove the casing 31 from the rim 21—24, it is only necessary to remove the retaining ring 24.

From the foregoing description of the various parts of the device, the operation thereof may be readily understood. Let us assume that it is desired to remove my improved vehicle wheel from its axle and place another wheel in its stead. In this event, it is merely necessary to unfasten the locking ring 16, which may be done by the use of a spanner wrench which is arranged to engage with an opening 36 in the side wall of the ring, and to move the entire disk 9 laterally from engagement with the hub 3. A new wheel may be placed upon the hub 3 and locked in place by means of the locking ring 16. From inspection of the drawing, it will be noted that the tighter the ring 16 is turned, the more rigid the disk 9 is held upon the hub.

Let us assume now that it is necessary to remove the casing 31 and the inner tube 34. This is done by removing the nuts 27 from the bolts 26, and moving the retaining ring 24 from engagement with the disc 9. It is then a simple matter to shift the entire casing 31, with its inner tube 34 and the auxiliary rim 28, from the rim portion 21 of the disk. In this manner the tube may be easily moved out of engagement with the casing, and a new tube substituted therefor, if necessary. In replacing the casing 31, the insert 33, together with the tube 34 and the rim 28, is moved laterally upon the rim portion 21, so that the innermost bead 32 will lie in the portion 22. The retaining ring 24 is then clamped in place by means of the bolts 26—27.

If, in any event, the inner tube 34 should become punctured while the motor vehicle, upon which the wheel is used, is in motion, there is no danger of the casing 31 becoming dislodged from its supporting rim 21—24, since the beads 32 are virtually locked between the rim 21—24 and the auxiliary rim 28 in such a manner as to prevent any outward movement of the casing 31, even though all the air in the tube 34 be expelled. It will be noted that in my improved vehicle wheel, I still retain the important feature embodied in the use of an inner tube having more than normal cubical contents, and the tube 34, thus permitting low air pressure and greater cushioning effect.

The ring 16 is constructed with a view to keep it securely in position, after it is once set, by pressure of the disk hub on the inner circumferential, and the projection forming a seat for the outer portion of the disk hub.

I claim:

1. A vehicle wheel of the character described comprising a hub member, said hub member being provided with an annular groove in the side wall thereof and concentric with the axis of the hub, said groove being V-shaped in cross section, a disk having an opening through the center thereof arranged to be placed upon said hub, said disk being fashioned with an annular projection concentric with said opening substantially V-shaped in cross section, and arranged to be received in the groove in said hub member, and a locking ring having threads on the inner wall thereof and arranged to engage with threads provided on the exterior wall of said hub for clamping said disk in place upon said hub, said disk being carried with its outer peripheral edge fashioned to receive a vehicle tire thereupon.

2. A vehicle wheel of the character described, comprising a hub member, said hub member being fashioned with an annular groove in the side wall thereof concentric with the axis of the hub and substantially V-shaped in cross section, a disk having an opening through the center part thereof, and laterally extending, annular projections concentric with said opening, said projections being V-shaped in cross section, and a locking ring having threads on the inner wall thereof arranged to engage with the threads on the exterior wall of said hub, said ring having an annular groove on the end wall thereof V-shaped in cross section, said grooves in said hub and in said retaining means being arranged to receive the annular projections on said disk respectively, whereby said disk may be bound in close engagement with said hub when said ring is tightened.

3. A vehicle wheel of the character described comprising a hub member, a disk having an opening through the central part thereof arranged for the partial projection of said hub member therethrough, said disk having projections on either side thereof adjacent to the openings therethrough and concentric therewith and lying in a plane substantially transverse to the plane of said disk, said hub member having a recess therein for partially receiving said projections on said disk, and a locking ring having a recess therein for partially receiving said projections on said disk and for holding said disk against movement relative to said hub, whereby said disk is secured against lateral and radial movement, said disk being formed with its outer peripheral edge fashioned to receive a vehicle tire thereupon.

4. A vehicle wheel comprising, in combination, a hub member, a disk engageable with a part of the hub member and having on its opposite side an annular projection V-shaped in cross-section, and a locking ring threaded on the hub member and clamping the disk against the hub member and having a V-shaped groove embracing said projection.

5. A vehicle wheel comprising in combination, a hub member, a disk engageable with a part of the hub member and having on its opposite side an annular projection V-shaped in cross-section, and a locking member clamping the disk against the hub member and having a V-shaped groove embracing said projection.

6. A vehicle wheel having, in combination, a hub member having an annular groove V-shaped in cross-section, a disk having a separate member V-shaped in cross-section engaging the disk at the edges of the V-section and fitting into the groove, and a locking member clamping the disk and hub member together and forcing the projection into the groove.

7. A vehicle wheel having, in combination, a hub member having an annular groove V-shaped in cross-section, a disk having a projection V-shaped in cross-section fitting into the groove, and a locking ring threaded on the hub member and clamping the disk and hub member together and forcing the projection into the groove.

8. A vehicle wheel having, in combination, a hub and a disk having respectively an annular groove and an annular separate member in the groove, and means for clamping said hub and disk together and forcing the separate member into the groove and common means for securing said member to the disk and for preventing rotation of the disk on the hub.

9. A vehicle wheel having, in combination, a hub member, a disk member, and a clamping member threaded on the hub member and forcing the hub member and disk member together, said members having interfitting annular grooves and projections.

10. A vehicle wheel having, in combination, a hub member, a disk member, and a clamping member forcing the hub member and disk member together, said clamping member having an annular groove and the disk member having a projection fitting in said groove.

11. A vehicle wheel including a disk having a wedge part, a hub, and a threaded member locking the disk and hub together and having wedging engagement with said part of the disk in a manner locking the threaded member against loosening.

12. A wheel including a disk having a central opening, and a separate pressed metal annular part V-shaped in cross-section secured about said opening and engaging the disk at both edges.

13. A wheel including a disk having a central opening, and a pair of pressed metal annular parts V-shaped in cross-section secured about said opening one on each side of the disk.

14. A wheel including a disk having a central opening and an annular projecting member about said opening on each side of the disk, and fastenings passing through the disk and said projecting members.

15. A wheel including a disk having a central opening and an annular projecting member V-shaped in cross-section about said opening, and fastenings passing through the disk and said projecting member.

16. A wheel including a disk having a central opening and an annular projecting member about said opening on each side of the disk, and fastenings passing through the disk and said projecting members, the fastenings being extended to form driving projections engagable with recesses in a hub.

17. A wheel including a disk having a central opening and an annular projecting member V-shaped in cross-section about said opening, and fastenings passing through the disk and said projecting member, the fastenings being extended to form driving projections engageable with recesses in a hub.

18. A wheel disk having a central opening, a pair of annular projecting members V-shaped in cross-section arranged on opposite sides of the disk and welded at their inner edges to the inner edge of the disk, and means fastening the outer edges of said members to the disk.

19. A wheel disk having a central opening, an annular projecting member V-shaped in cross-section arranged on one side of the disk and welded at its inner edge to the inner edge of the disk, and means fastening the outer edge of said member to the disk.

20. A wheel disk having a central opening, a pair of annular projecting members V-shaped in cross-section arranged on opposite sides of the disk and welded at their inner edges to the inner edge of the disk, and fastenings passing through the disk and said members and securing the outer edges of said members to the disk.

21. A wheel disk having a central opening, an annular projecting member V-shaped in cross-section arranged on one side of the disk and welded at its inner edge to the inner edge of the disk, and fastenings passing through the disk and said member and securing the outer edge of said member to the disk.

LUDGER ELIZÉ LA BRIE.